(12) United States Patent
Holden et al.

(10) Patent No.: US 11,237,551 B2
(45) Date of Patent: Feb. 1, 2022

(54) REAL-TIME AUTOMATION FOR MONITOR AND CONTROL OF ELECTRO-MECHANICAL SYSTEM

(71) Applicants: Daniel P. Holden, Fredericksburg, VA (US); Sean R. Chapin, Richmond, VA (US); Lynda R. Hester, Fredericksburg, VA (US); Victoria Snyder, Fredericksburg, VA (US)

(72) Inventors: Daniel P. Holden, Fredericksburg, VA (US); Sean R. Chapin, Richmond, VA (US); Lynda R. Hester, Fredericksburg, VA (US); Victoria Snyder, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 404 days.

(21) Appl. No.: 16/273,756

(22) Filed: Feb. 12, 2019

(65) Prior Publication Data
US 2020/0019153 A1 Jan. 16, 2020

Related U.S. Application Data

(60) Provisional application No. 62/697,433, filed on Jul. 13, 2018.

(51) Int. Cl.
*G05B 23/02* (2006.01)
*G06K 9/62* (2006.01)
*G06N 7/00* (2006.01)
*G05B 19/042* (2006.01)

(52) U.S. Cl.
CPC ..... *G05B 23/0291* (2013.01); *G05B 19/0428* (2013.01); *G05B 23/0283* (2013.01); *G06K 9/6265* (2013.01); *G06N 7/005* (2013.01)

(58) Field of Classification Search
CPC ............ G05B 23/0291; G05B 23/0283; G05B 19/0428; G06K 9/6265; G06N 7/005
See application file for complete search history.

(56) References Cited

U.S. PATENT DOCUMENTS

2007/0208841 A1* 9/2007 Barone ............... B61L 15/0036
709/223

OTHER PUBLICATIONS

J. D. Kelleher et al.: *Fundamentals of Machine Learning for Predictive Data Analytics*, MIT Press, 2015, https://www.google.com/wl?sa=t&rct=j&q=&esrc=s&source=web&cd=8&red=2ahUKEwjetKnEjdTeAhXpdN8KHSbd8fIQFjAHegQlAxAC&url=http%3A%2F%2F222.195.93.137%2Fgitlab%2Fwinston.wen%2Fbookshelf%2Frow%2F82f0d2633bd8385c6a077fbfc1cf05a6e20c178c%2F%25E6%259C%25BA%25E5%2599%25A%25E5%25AD%25A6%25E4%25B9%25A0%2FMIT.Fundamentals.of.Machine.Learning.for.Predictive.Data.Analytics.0262029448.pdf&usg=AOvVaw1kgw-1_ELNoov0d-WP0GBI.
M.T. Hagan et al.: *Neural Net Design*, 2/e, Martin Hagan, 2014. http://hagan.okstate.edu/NNDesign.pdf.
I. Goodfellow et al.: *Deep Learning*, MIT Press, 2016, https://project.inria.fr/deeplearning/files/2016/05/presentation.pdf.

(Continued)

*Primary Examiner* — Manuel A Rivera Vargas
(74) *Attorney, Agent, or Firm* — Gerhard W. Thielman

(57) ABSTRACT

A computer-implemented system is provided for monitoring an electro-mechanical device. The system includes a sensor, a data acquisition receiver, and an analysis processor. The sensor measures a parameter of the device as an analog signal. The data acquisition receiver converts the analog signal into a digital signal. The analysis processor assigns the signal data to a condition state responsive to an action mode to control the device. The system is intended for automated implementation in real-time.

14 Claims, 7 Drawing Sheets

(56) References Cited

OTHER PUBLICATIONS

M. K. Kochenderfer: *Decision Making Under Uncertainty*, MIT Press, 2015. https://web.stanford.edu/-mykel/pomdps.pdf.
W. Q. Meeker et al.: *Statistical Intervals: A Guide for Practitioners* 2e, Wiley, 2017. https://1lib.us/book/3374941/7baed2.

* cited by examiner

Table 2. Data Aquisition System Hardware.

| Component | Hardware | Approx. Cost |
|---|---|---|
| Chassis | NI PXIe-1085 | $11,000 |
| Controller | NI PXIe-8135 | $7,000 |
| DAQ Cards | NI PXIe-6376 | $6,000 per card |
| Timing Card | NI PXI-6683H | $3,000 |

Table 1. Parameter Values of POMDP, Example.

| | |
|---|---|
| $p(o^0\|f^0)$ | 0.90 |
| $p(o^1\|f^0)$ | 0.10 |
| $p(o^0\|f^1)$ | 0.05 |
| $p(o^1\|f^1)$ | 0.95 |
| $p(f^0\|h^0)$ | 0.95 |
| $p(f^1\|h^0)$ | 0.05 |
| $p(f^0\|h^1)$ | 0.00 |
| $p(f^1\|h^1)$ | 1.00 |
| $p_d$ | 0.02 |
| $r_c$ | 1 |
| $r_d$ | -25 |
| $r_{s,h0}$ | -5 |
| $r_{s,h1}$ | 5 |
| $\gamma$ | 0.85 |

Fig. 5

REAL-TIME AUTOMATION FOR MONITOR AND CONTROL OF ELECTRO-MECHANICAL SYSTEM

CROSS REFERENCE TO RELATED APPLICATION

Pursuant to 35 U.S.C. § 119, the benefit of priority from provisional application 62/697,433, with a filing date of Jul. 13, 2018, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to monitoring and controlling electro-mechanical systems. In particular, the invention relates to automated sensing of measurable parameters and setting controls of inputs for systems such as guns, energy storage systems, motors, generators, turbines, pumps and pulsed power release devices.

All branches of the United States military rely on a variety of electrical and mechanical systems to perform their duties. Ensuring normal operation is imperative for high-cost or critical Navy systems in order to protect the fitness or "health" of its fleet. Currently, many of these systems rely on scheduled maintenance, hardware inspections, and manual analysis of data collected from the system of interest.

In a scenario where the warfighter is engaging a threat, humans also must quickly decide whether to continue operating the system of interest in a degraded state of fitness once damage occurs, or to terminate (i.e., shutdown) operations and rely on another system to counter the threat. All of these actions rely on human operations, decisions, and interactions, which have been repeatedly shown to be unreliable by the various mishaps and tragedies reported in the news on a yearly basis.

SUMMARY

Conventional system monitoring techniques yield disadvantages addressed by various exemplary embodiments of the present invention. In particular, various exemplary embodiments provide a computer-implemented system for monitoring an electro-mechanical device. The system includes a sensor, a data acquisition receiver, and an analysis processor. The sensor measures a parameter of the device as an analog signal. The data acquisition receiver converts the analog signal into a digital signal. The analysis processor assigns the signal data to a condition state responsive to an action mode to control the device.

BRIEF DESCRIPTION OF THE DRAWINGS

These and various other features and aspects of various exemplary embodiments will be readily understood with reference to the following detailed description taken in conjunction with the accompanying drawings, in POMDP like or similar numbers are used throughout, and in which:

FIG. 5 is a tabular view of probability and cost parameters.

DETAILED DESCRIPTION

Figure 1:
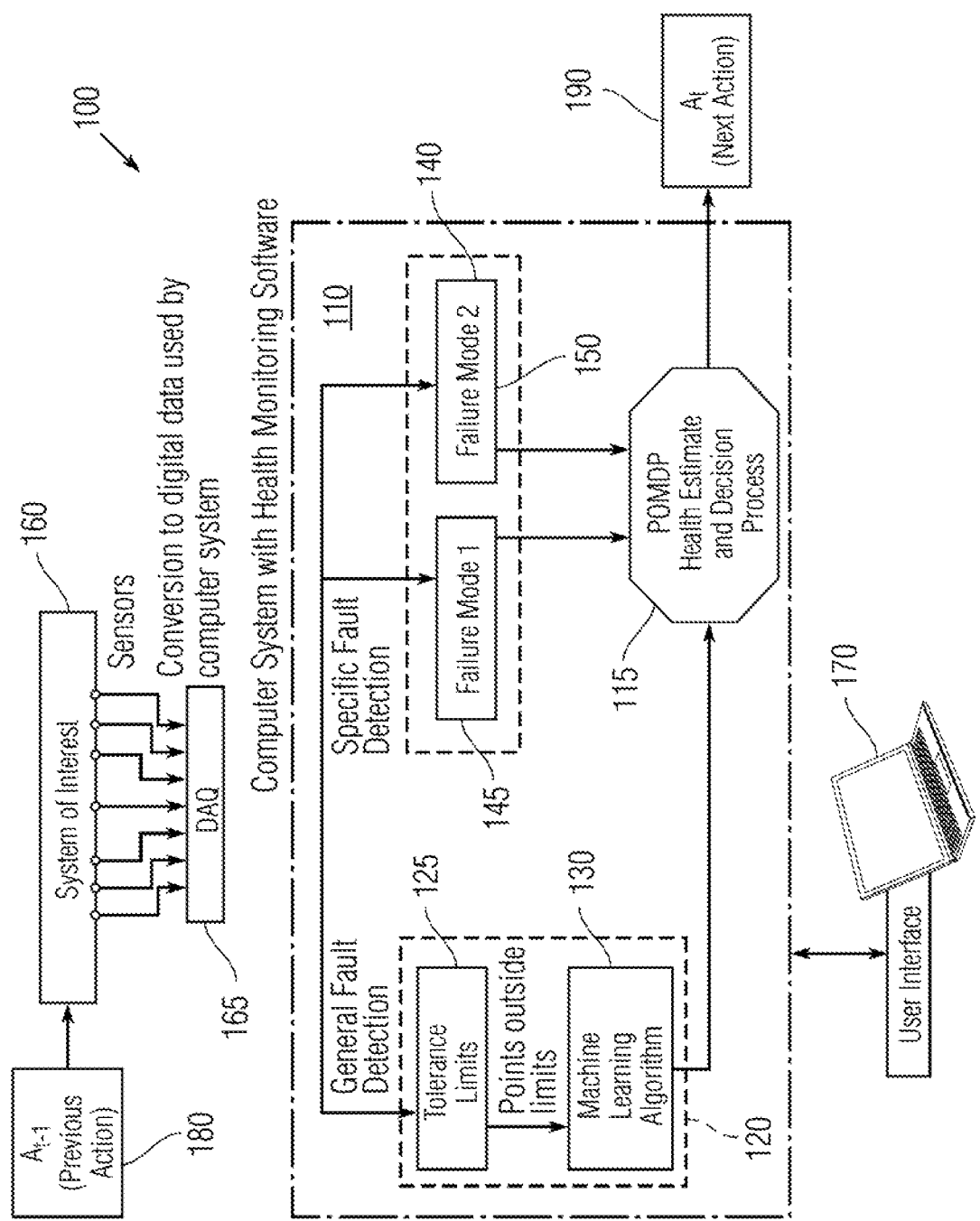
FIG. 1 is a flowchart view of an exemplary monitoring system.

In the following detailed description of exemplary embodiments of the invention, reference is made to the accompanying drawings that form a part hereof and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

The proposed system fills the capability gap from conventional maintenance techniques by eliminating human unpredictability and negligence as a failure point by implementing fully-automated, real-time fitness monitoring and decision-making. The purpose of exemplary embodiments is to provide fully-automated, real-time fitness monitoring of an electrical or mechanical system. The exemplary monitoring system estimates the fitness of the system of interest and identifies deviations from nominal performance and faults to prevent the system from incurring damage. Exemplary embodiments incorporate robust statistical methods and machine learning algorithms to estimate the fitness of the system of interest, and then make an optimal decision on what action the system should perform next based on cost/reward criteria specified by the operator. The exemplary process may be implemented to execute automatically in real-time.

Early identification of deviations from nominal can prevent the system from possibly incurring damage when operating in a degraded state and for predicting when preventative maintenance should be performed. In other scenarios, it may be more beneficial to continue operating the system in a degraded state rather than shutting down. An electrical or mechanical system of interest is instrumented with sensors to measure important electrical (voltage, currents, electromagnetic fields, etc.) or mechanical (force, pressure, motion, etc.) quantities for deducing the fitness of said system. The exemplary process employs a Partially Observed Markov Decision Process (POMDP).

FIG. 1 shows a flowchart view 100 of the exemplary monitoring system. Software equipped computer monitoring system 110, a POMDP operation 115, general fault detection 120, tolerance limits 125, machine learning algorithm 130, specific fault detection 140, first and second failure modes 145 and 150, system of interest 160, DAQ 165, user interface 170, previous action $A_{t-1}$ 180 and next (i.e., present) action 190 $A_t$.

The sensors convert these measured quantities into electrical signals that are captured by a Data Acquisition System (DAQ). The DAQ converts the electrical signals into digital data that are then incorporated by the fitness monitoring algorithms. Such analytical processes may be implemented in software that executes on a computer system. This computer system may include the following, but is not limited to: a microcontroller, graphics processing unit (GPU), random access memory (RAM), non-volatile memory, and human interaction hardware. The computer system may also be integrated with the DAQ as a single exemplary system.

Hardware or software digital filters may be required to reduce unwanted noise received by the sensors. The number of sensors and signals is not inherently limited. The incorporation of 80+ sensors has been successfully tested and the data from which were evaluated in less than one second. After each action performed by the system 160, the collected signals are analyzed using fitness monitoring algorithms to determine whether the measurements match expected performance or a deviation from nominal or fault occurred. The fitness monitoring algorithms includes robust statistical and machine learning algorithms 130 used to detect deviations from nominal performance and faults, assess the fitness of the system, and decide whether to continue or stop system operation. Exemplary embodiments may include the User Interface (UI) 170 used to configure the performance of these algorithms for the system of interest. These configurations can be saved or loaded for use at any time.

Fitness monitoring methods fit into two general categories: general fault detection and specific fault detection. General fault detection uses time-varying statistical tolerance limits to automatically characterize nominal system performance and detect deviations from this nominal behavior. The National Institute of Standards and Technology (NIST) provides information on these limits in the *NIST Engineering Statistics Handbook*. Data that exceed the tolerance limits are checked by a machine learning algorithm that acts like a filter to prevent false alarms. The tolerance limits may be computed in the time-domain for actions of finite duration, or the frequency domain for long-duration continuous actions.

Figure 2:
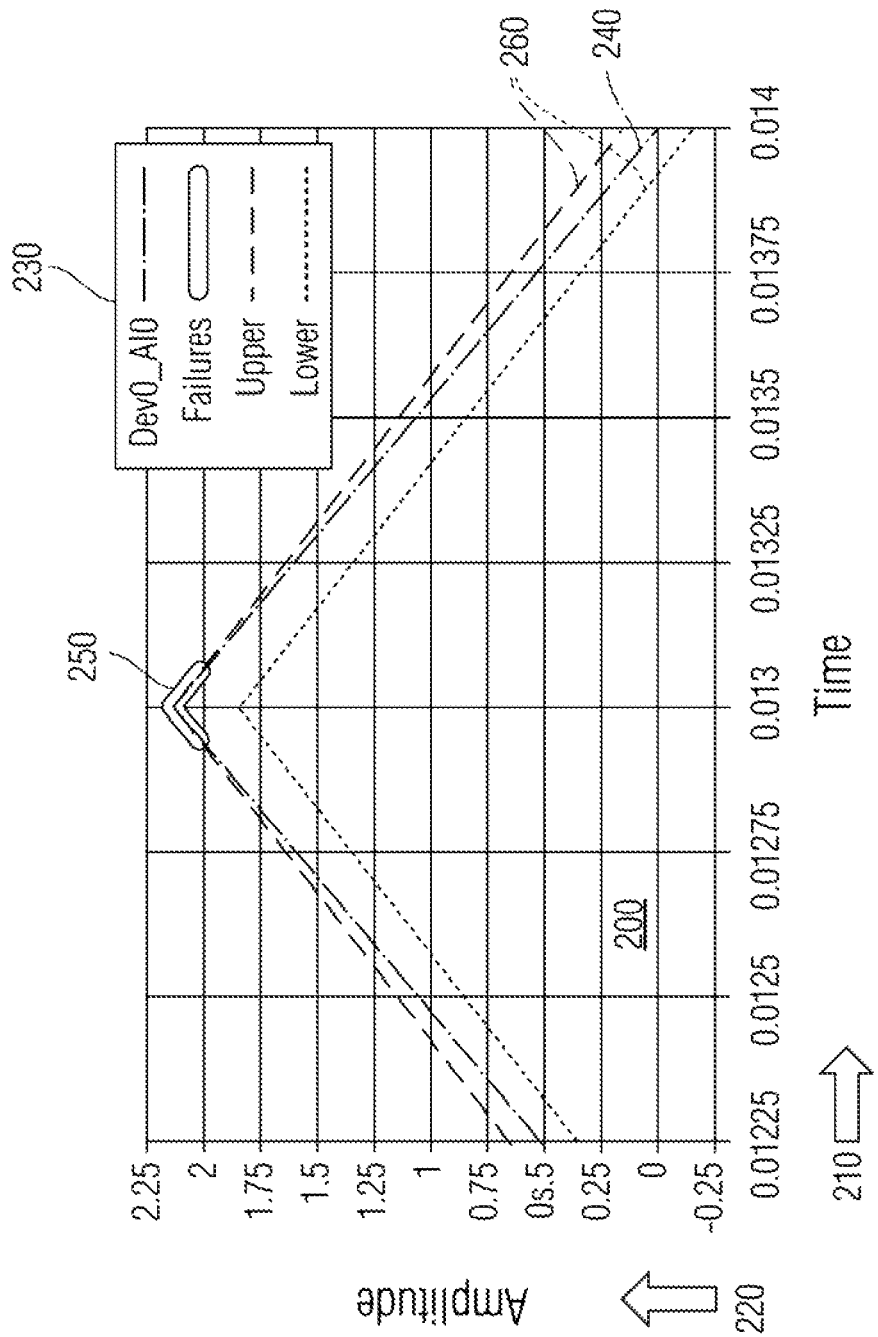
FIG. 2 is a display view of thresholds.

FIG. 2 illustrates an example of time-domain tolerance limits in a graphical screen view 200. Time 210 (seconds) denotes the abscissa and amplitude 220 denotes the ordinate in arbitrary units. A legend 230 identifies Dev0_AI0 240, failures 250 and the upper and lower failure limits 260. The time interval varies from 0.012 second to 0.014 second, while amplitude ranges from −0.25 to +2.25, with peak failure occurring at time of roughly 0.013 second.

The tolerance limits can be generated using an accurate model of the system by varying system parameters as random variables with uncertainty for many repeated trials, such as that performed in a Monte Carlo Simulation. For instances lacking such a model, the tolerance limits can be generated by operating the system 160 of interest to perform the desired actions while recording these experimental data. This exemplary method has been used to generate tolerance limits with as few as ten repeated actions to characterize system performance.

The exemplary tolerance limits for a Gaussian Random Process are provided by the following relations:

$$T_i = \overline{Y}_i \pm k_2 s_i, \qquad (1)$$

where $T_i$ are the upper and lower limits of the $i^{th}$ sample, $\overline{Y}_i$ and $s_i$ respectively refer to the mean and standard deviation of the $i^{th}$ sample, and $$k_2 = \sqrt{\frac{(n-1)\left(1+\frac{1}{n}\right)z_{(1-p)/2}^2}{\chi_{1-\alpha,n-1}^2}}, \qquad (2)$$

where $k_2$ is a statistical parameter that depends on the proportion of the nominal behavior to cover probability p, the confidence level $\alpha$ and the number of samples n from NIST. The critical values of the standard normal distribution and chi-square distribution are also used in eqn. (2), namely z and $X^2$, respectively. Tolerance limits can also be calculated for non-Gaussian data and using nonparametric techniques, as described in W. Q. Meeker et al., *Statistical Intervals: A Guide for Practitioners and Researchers*, 2e.

Figures 3, 9:
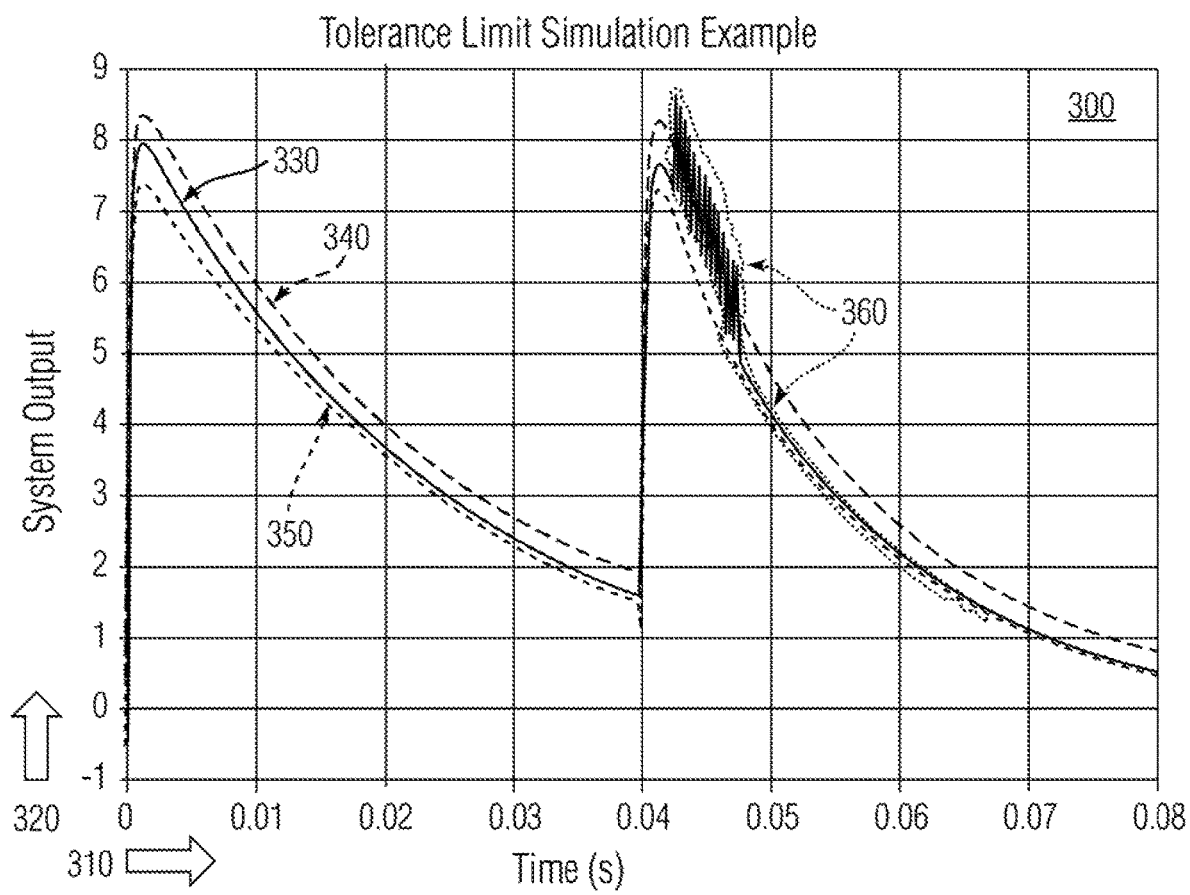
FIG. 3 is a graphical view of tolerance limits for an electrical fault.
FIG. 9 is a tabular view of monitoring equipment.

FIG. 3 shows a simulation example graphical view 300 of tolerance limits. Time 310 in seconds denotes the abscissa and system output 320 denotes the ordinate. A shot signal 330 shows the system response, bounded by an upper limit 340 and a lower limit 350, all tapering from initial peak values until reinitialized at 0.04 second. The dark highlighted regions 360 identify simulated electrical faults and degradation that register beyond the tolerance limits.

These data in regions 360 constitute values that fall outside the tolerance limits and may be verified using a Decision Tree algorithm to determine whether and what type of deviation from nominal performance occurred. The highlighted and scattered points outside the limits before the time of 0.05 second would be categorized as an electrical fault, and the points outside the limits after 0.05 second would be categorized as the resulting system degradation that occurred due to the fault.

Exemplary embodiments for a specific fault detection process 140 may be developed when the system 160 of interest displays characteristic failure modes with patterns that can be categorized into different levels of risk, ranging from nominal performance to severe damage risk. A statistical learning or machine learning algorithm can then be formulated and trained on historical data that have been correctly categorized, performing real-time pattern recognition during operation. A different algorithm can be developed and executed to check for each type of known failure mode.

There are numerous machine learning algorithms 130 and training algorithms, as well as many variants of each that can be used for pattern recognition as described. Machine/statistical learning algorithms 130 that have been successfully employed for fitness monitoring by the described system include but are not limited to the following: Logistic Regression, Decision Trees, Neural Networks, and Principal Component Analysis. Decision Trees are described by J. D. Kelleher et al., *Fundamentals of Machine Learning for Predictive Analytics*. Neural Networks are described by M. T. Hagan, *Neural Network Design* 2e and I. Goodfellow et al., *Deep Learning*. Component Analysis is described by S. Theodoridis, *Machine Learning: a Bayesian and Optimization Perspective*.

After performing each action, exemplary embodiments incorporate the results from the general and specific fault detection methods to determine whether to continue using the system as desired, perform a different action, or to stop the system to prevent damage. This process is a statistics-based Artificial Intelligence (AI) algorithm called a Partially Observed Markov Decision Process (POMDP), which incorporates all of the statistical information available for the system to estimate the system fitness and make an optimal decision. POMDP is described by M. J. Kochenderfer, *Decision Making Under Uncertainty*; V. Krishnamurthy, *Partially Observed Markov Decision Processes: From Filtering to Controlled Sensing*; and D. Bertsekas, *Dynamic Programming and Optimal Control* v. 1, 4e.

This information includes but is not limited to: the overall fault-rate and degradation rate of the system 160 of interest (and subsystems if applicable), the accuracy of the fault detection method(s), and the probability that detected fault(s) will damage the system. The POMDP state space includes a fitness state space S including the various levels of fitness the system may take (nominal to severe damage), and an action space a including the possible actions the system 160 of interest may perform during automated operation.

Figure 4:
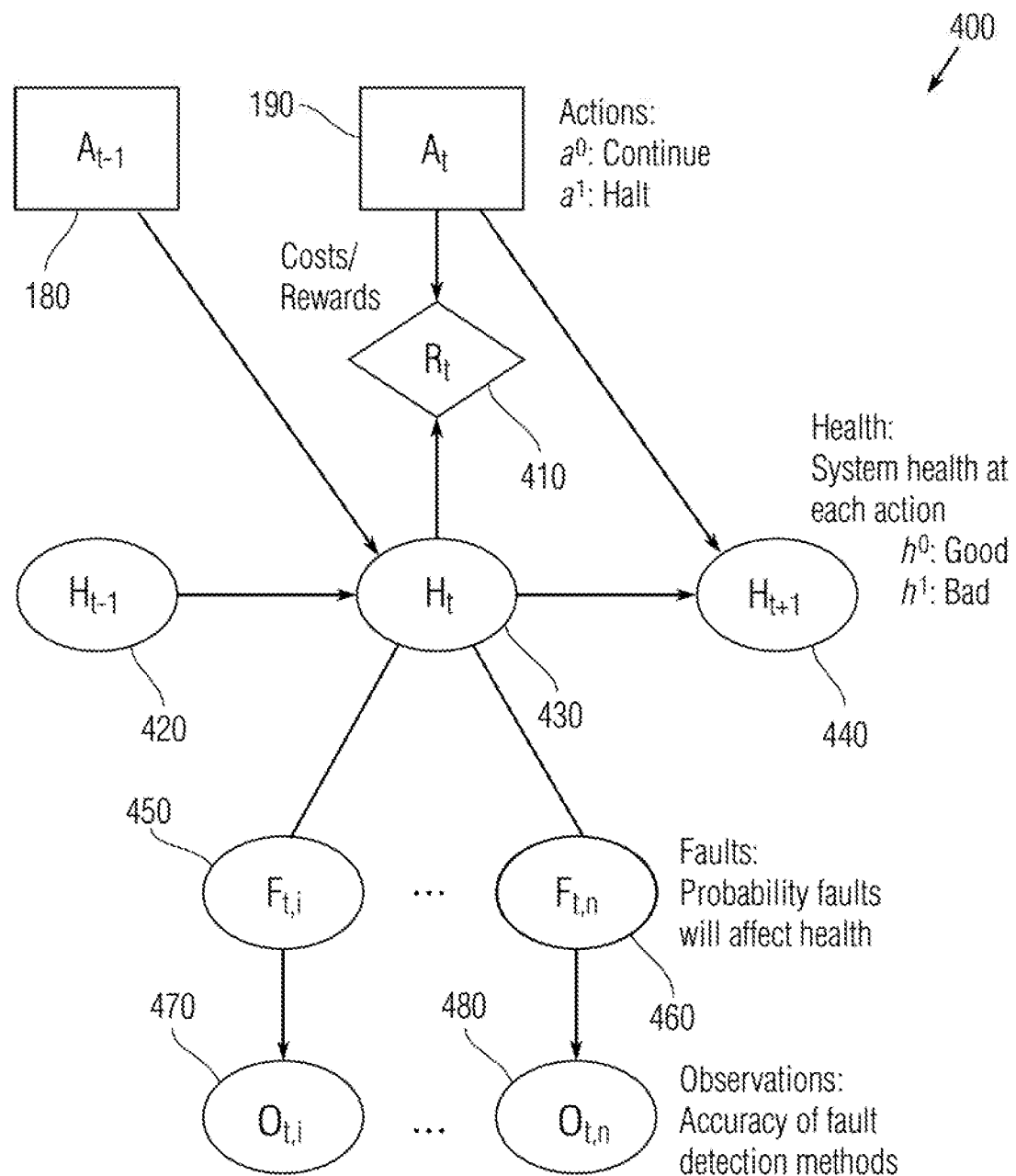
FIG. 4 is a diagram view of a monitoring assessment process.

FIG. 4 illustrates an example of a simple POMDP operation 115 in a diagram view 400. Actions past $A_{t-1}$ 180 and present $A_t$ 190 comprise a continue and $a^1$ halt. A present costs/rewards result $R_t$ 410 receives present action $A_t$ 190. A prior fitness status $H_{t-1}$ 420 denotes the system health at the previous time-step. A current fitness status $H_t$ 430 denotes the system health at the present time-step. A future fitness status $H_{t+1}$ 440 denotes the system health at the next time-step. The current fitness status $H_t$ 430 and the next action 190 determine the cost/reward $R_t$ 410 to incur and the future fitness status 440. The fitness status can be either $h^0$ good or $h^1$ bad.

The current fitness status $H_t$ 430 is estimated based on, the probability that any detected faults $F_{t,i}$ (for present time t and fault type i) designated by $F_{t,1}$ 450 through $F_{t,n}$ 460 will or won't affect the current fitness status 430, and system observations $O_{t,1}$ 470 through $O_{t,n}$ 480, which represents the fault detection algorithms used to detect the fault $F_{t,i}$ with statistical accuracy between zero and unity. This estimated current fitness status $H_t$ 430 determines the next action $A_t$ 190 to execute, which along with the current system fitness $H_t$ 430 determines the future fitness status $H_{t+1}$ 440.

Figure 6:
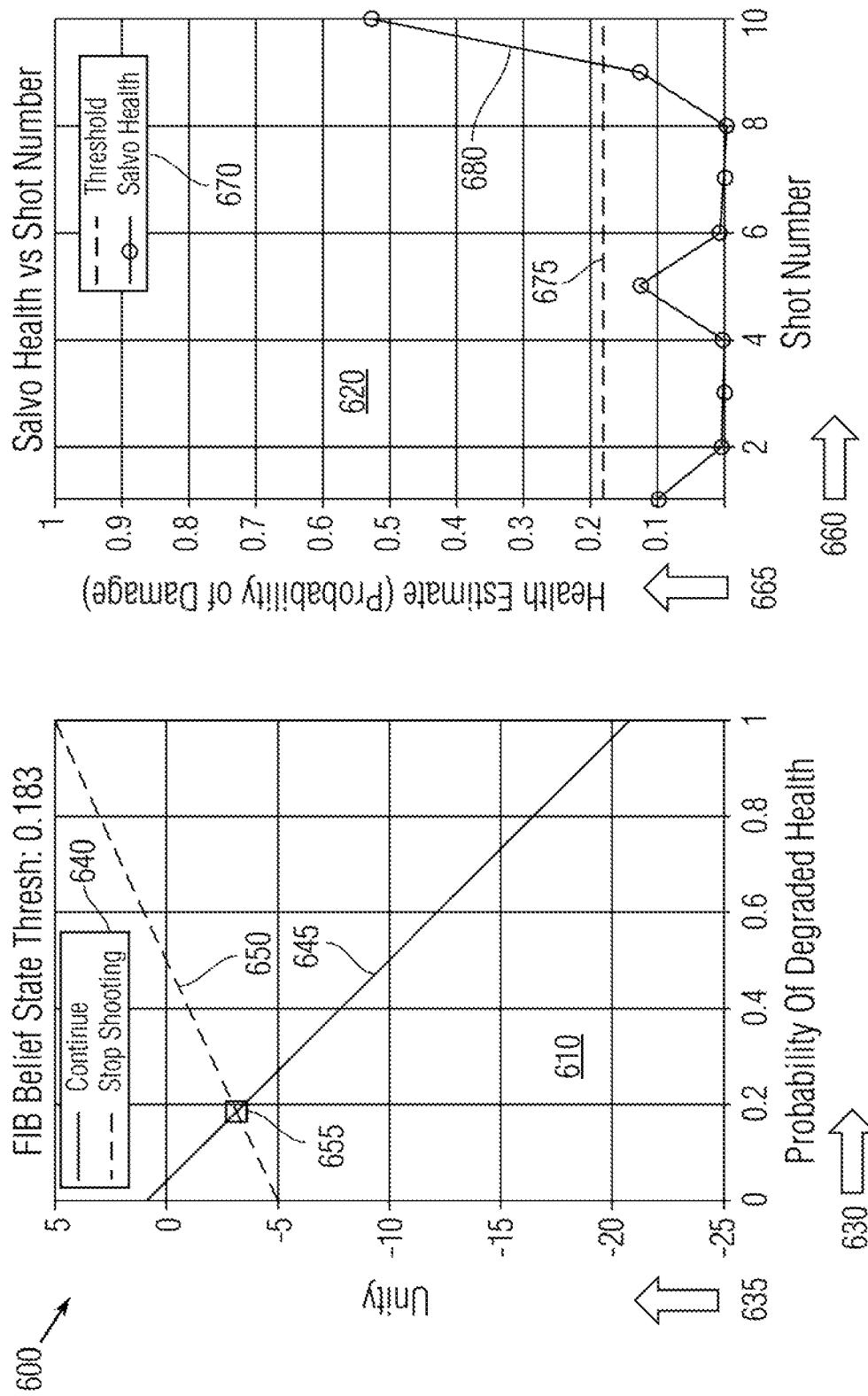
FIG. 6 is a graphical view of probability effects.

The POMDP operation 115 can be further described by a numerical example using parameter values from Table 1 shown by FIG. 5 in tabular view 500. Probability values are set between zero (0) and unity (1), and costs have positive or negative weighting values. FIG. 6 shows a graphical view 600 of Belief State plot 610 and Salvo Health plot 620. For the Belief plot 610 relating to Fast Informed Bound (FIB) method, probability of degraded health 630 denotes the abscissa, while utility 635 denotes the ordinate. A left legend 640 identifies decisions to continue 645 and stop shooting 650 with the intersection 655.

For the Salvo plot 620, shot number 660 denotes the abscissa, while health estimate 665 denotes the ordinate. A right legend 670 identifies values for threshold 675 and salvo health 680. The threshold 675 corresponds to the probability of intersection 655. The utility function computed using the FIB method determines the threshold probability 675 to stop shooting at 0.183 corresponding to intersection 655, which is equivalent to the probability of damage. The intersection 655 represents the point where the utility of stopping shooting is greater than the expected utility of continuing to shoot. Here the cost of damaging the system $r_d$ is greater than the cost of a false alarm $r_{x,h_0}$ or the reward for completing a single shot $r_e$.

Costs and rewards are also specified for performing each action in the various fitness states so that the exemplary Fitness Monitoring System can automatically conduct an optimal decision after each performed action. A conservative POMDP operation 115 for a system 160 with a large-cost incurred when damage occurs would shut down the system 160 after any detected fault. Another approach would be to perform a less risky action with a reduced detrimental effect when the system fitness degrades. In a scenario in which the warfighter engages a threat, operating the system 160 (such as a weapon system) in a degraded state may have less cost associated with it than not operating the system 160 at all, which could result in a critical loss of a portion of the fleet itself.

After each action, the exemplary embodiments produce the reward/cost 410 to perform an action 190 that maximizes the expected reward and minimizes cost based on the reward and cost criteria specified by the operator or otherwise established. The reward/cost (or utility) matrix R(h,a) for the specified state and action is as shown:

$$R(h, a) = \begin{bmatrix} (1 - p_d)r_c + p_d r_d & r_{s,h^0} \\ r_d & r_{s,h^1} \\ 0 & 0 \end{bmatrix}, \quad (3)$$

where each element in eqn. (3) represents the expected reward or cost corresponding to taking an action given the fitness state, computed by taking the statistical expectation across the set of possible state transitions.

An example salvo using the same parameter values is shown in the salvo plot 520. The belief state is updated after each shot using eqn. (9), described subsequently. The salvo begins with an initial estimate of a 90% probability of a healthy system, and a probability of damage of 10%. For shots 2 through 4, a fault alarm does not occur so the probability of damage decreases. On shot 5, a fault alarm is triggered, resulting in an increase in the probability of damage that does not exceed the threshold, so the salvo continues. The next three shots do not exhibit any fault alarms, so the probability of damage again decreases, indicating that shot 5 could have been a false alarm.

After shot 8, two sequential fault alarms occur causing an increase in the probability of damage that exceeds the threshold on the last shot and ends the salvo. This example demonstrates the encoding of risk into the cost and reward values implemented to determine the stopping threshold. As the cost of damaging the system 160 becomes larger, the operator accepts less risk and stops the salvo at a lower probability of damage. For an operator willing to accept greater risk, then a smaller cost of damaging the system 160 leads to a larger probability of damage before a salvo is stopped.

The system 160 has a binary fitness state space (good versus bad) and a binary action space (continue versus stop). The fitness (or health) of the system at the current time-step $H_t$ 430 depends only on the fitness from the previous step $H_{t-1}$ 420 and the previous action $A_{t-1}$ 180 that was taken. At the current time-step t, the fitness of the system $H_t$ 430 is estimated based on the overall fault/degradation rate $p_d$ of the system 160, any observed faults and their detection accuracy for each fitness monitoring algorithm $O_{t,1}$, $O_{t,2}, \ldots, O_{t,n}$ 470, 480 used to analyze the most recent data collected, and the probability that the observed faults $F_{t,1}$, $F_{t,2}, \ldots, F_{t,n}$ 450, 460 will damage the system 160. Incorporating this fitness estimate and an operator-specified cost/reward criteria $R_t$ 410, the optimal decision for the next action $A_t$ 190 can be determined.

The state transition matrix $T(h'|h, a)$ represents the probability of the fitness h' at the next state given the fitness h at the current state and the action a at the current state. For the example shown in view 500, an artificial terminal state must also be included to compute the solution for the POMDP operation 115 using eqn. (10) defined subsequently. This terminal state is reached upon operational discontinuance of the system 160, either due to its successful completion of a sequence of actions or its shutdown, where no further costs or rewards are incurred.

The state transition matrix for the POMDP with example shown in view 400 is given by the following expressions:

$$T(h' \mid h, a^0) = \begin{bmatrix} 1-p_d & p_d & 0 \\ 0 & 1 & 0 \\ 0 & 0 & 1 \end{bmatrix}, \quad (4)$$

$$T(h' \mid h, a^1) = \begin{bmatrix} 0 & 0 & 1 \\ 0 & 0 & 1 \\ 0 & 0 & 1 \end{bmatrix}, \quad (5)$$

where $a^0$ and $a^1$ are the respective actions to continue and shutdown, and $p_d$ is overall probability of damage for the system of interest. Each row in the probability matrices sums to unity so that the probability of all events in the sample space sums to unity to include all possible events.

The artificial terminal state comprises the single nonzero value of unity (1) in the right-most element of the bottom row. The diagram in view 400 represents an infinite horizon state transition matrix, meaning that the exact number of time-steps is not known or may be assumed to be practically infinite. In this case, the terminal state is used for the numerical computation in eqn. (10) so that no further costs or rewards are needed upon reaching the terminus.

The observation probabilities represent the accuracy of a fitness monitoring algorithm and is given by the following conditional probability matrix:

$$O(o \mid f) = \begin{bmatrix} p(o^0 \mid f^0) & p(o^1 \mid f^0) \\ p(o^0 \mid f^1) & p(o^1 \mid f^1) \\ 0 & 0 \end{bmatrix}, \quad (6)$$

where o represents the fitness monitoring algorithm observation, f represents whether a fault occurred, and p(x|y) denotes the conditional probability of event x occurring given event y has occurred. The superscript of the matrix elements represents whether an alarm or a fault doesn't (zero) or does (one) occur, respectively. Example values are listed in view 500. The third row of this matrix incorporating zeros has no effect on the computations of the launcher fitness, but accommodates the addition of the extra terminal state.

The fault damage probabilities F(f|h) are expressed by the conditional probability matrix:

$$F(f \mid h) = \begin{bmatrix} p(f^0 \mid h^0) & p(f^1 \mid h^0) & 0 \\ p(f^0 \mid h^1) & p(f^1 \mid h^1) & 0 \end{bmatrix}, \quad (7)$$

where $p(f^\beta|h^\delta)$ denoting conditional probability terms for the occurrence of fault $f^\beta$ given an event $h^\delta$, with $\beta$ and $\delta$ being either zero (absent) and one (present).

The system fitness estimate, which is a continuous random variable between the values of zero and one that represents the probability of damage, is updated after each action using the discrete Hidden Markov Model (HMM) filter equation from Kochenderfer and Krishnamurthy:

$$b'(h') \propto p(o_1 \ldots o_n \mid h', b) p(h' \mid a, b), \quad (8)$$

where p is probability, b is the current random variable that estimates the system fitness, often referred to as the belief state, b' is the random variable at the next step, h' is next status state, and a is the action.

Adapting eqn. (8) for the exemplary system using the law of total probability and conditional independence assumptions provides the following relation:

$$b'(h') \propto \left[ \prod_{i=1}^{n} \sum_{f_i \in F_i} F(f_{i,j} \mid h') O(o_i \mid f_{i,j}) \right] \sum_{h_i \in H} T(h' \mid h_i, a) b(h), \quad (9)$$

where the raw values output from this equation for $h^0$ and $h^1$ must be normalized by dividing each by the sum of these values.

For the system's action in a healthy state, a small cost or reward $r_c$ can model this effect. For damage to the system 160, the cost is denoted by $r_d$. Stopping the salvo is denoted by reward or cost $r_x$, with $r_{x,h_0}$ as the cost for incorrectly stopping a salvo when the system 160 remains healthy and $r_{x,h_2}$ representing the reward for correctly stopping a salvo with the system 160 damaged. One last parameter, the discount factor $\gamma$, specifies whether to maximize short term rewards or to more equally weight actions to maximize long-term rewards.

The state transition probabilities and the cost/reward matrix can be specified by the operator, preferably before initiation of POMDP. All statistical methods and machine learning algorithms involve some operator-specified parameters, including the number of samples to collect, confidence levels, etc. Considering the thresholds or limit levels, there are two separate algorithms. The signal is compared to the statistical tolerance limits to determine whether any data points fall outside these limits. For points outside these limits, the "failed" points are assessed to determine whether a fault may have occurred along with the severity of this possible fault. Next, these possible faults and their probabilities or severity are passed to the POMDP, which uses this information to determine the probability of damage for the system 160, called a condition state. This probability of damage is compared against optimal thresholds determined from the operator-specified cost/reward criteria to then determine the next action mode for the system 160.

Using these parameters, the expected reward/cost 410 is computed as a function of the system fitness to find a probability threshold where the cost to continue using the system 160 exceeds the cost of shutdown. In response to the belief state of the system fitness estimate exceeding this threshold, the exemplary process shuts down the system 160, and otherwise operation of the system 160 continues.

The FIB method is a numerical technique for computing this threshold, shown from Kochenderfer:

$$U(h, a)^{k+1} = \qquad\qquad\qquad\qquad\qquad\qquad (10)$$
$$R(h, a) + \gamma \sum_{a \in O} \max a' \left[ \sum_{h' \in H} O(o \mid h', a) T(h' \mid h, a) U(h', a')^k \right],$$

where this threshold value is computed iteratively until the change in value from iteration k to the next iteration k+1 becomes negligibly small. The intersection point between the lines specified by thresholds $U(h^0,a^0)$, $U(h^0,a^1)$ and $U(h^0,a^1)$, $U(h^1,a^1)$ offers the probability threshold to shut down the system when the fitness estimate, which is the probability of system damage, exceeds this threshold. The summation includes the state transition $T(h'|h,a)$, the conditional probability $O(o|h',a)$ and the fitness threshold $U(h',a')$.

Figure 7:
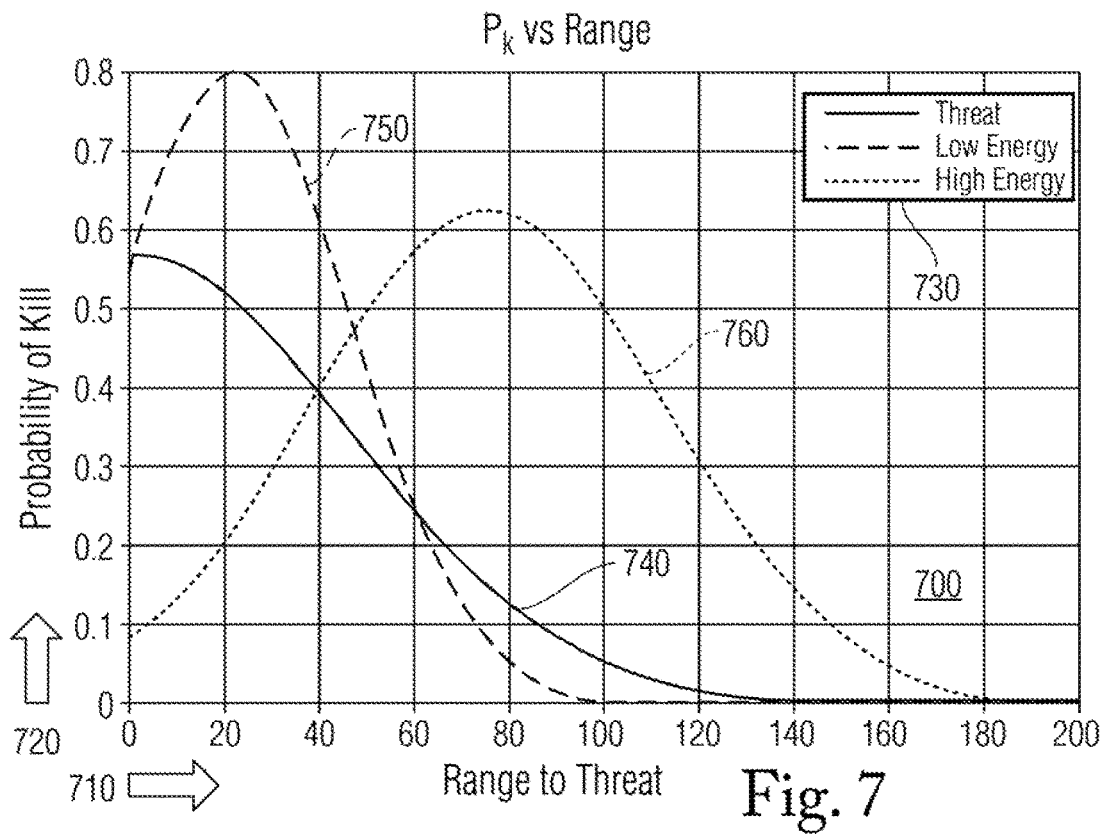
FIG. 7 is a graphical view of kill probability versus range.

An example warfighter scenario and results using the POMDP is described as follows. In this scenario, an incoming threat is approaching the warfighter, with a probability of kill $p_k$ that varies with distance. The warfighter has two different energy levels at which to operate a weapon system to attempt to defeat the threat, each with a different probability of kill that also varies with distance. FIG. 7 shows a graphical view 700 of the relationship of kill probability and range for a weapon system. Range to target threat 710 denotes the abscissa, while probability of kill $p_k$ 720 denotes the ordinate. A legend 730 identifies the threat probability 740 against the warfighter, the low-energy kill probability 750 and the high-energy kill probability 760. The higher energy operation, with maximum projectile velocity at muzzle exit, has a greater $p_k$ at longer ranges. The lower energy operation, with a lower muzzle exit velocity, has a greater $p_k$ at closer ranges, while the incoming threat's probability of kill increases as the target closes in on the warfighter.

Figure 8:
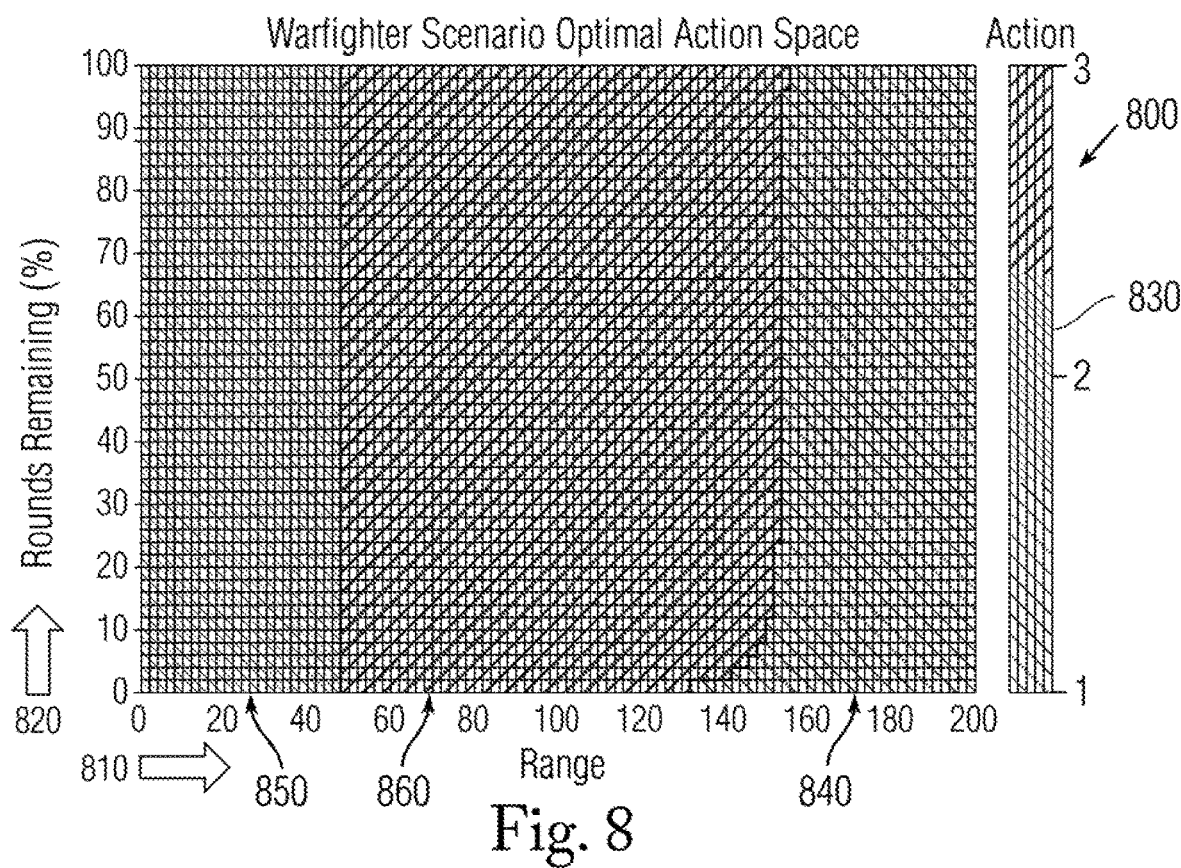
FIG. 8 is a graphical view of an optimal action space.

FIG. 8 shows a graphical view 800 of a warfighter scenario for optimal action space. Range 810 (in arbitrary units) denotes the abscissa, while ammunition rounds remaining 820 (in percentage) denotes the ordinate. A legend 830 distinguishes between actions: action 1 (white) represents holding fire, action 2 (light grey) represents firing as a low energy operation, and action 3 (dark grey) represents firing as a high energy operation. The solution to this scenario provides results for the optimal action space $O(o|h', a)$ as a function of range and ammunition. As the rounds remaining decrease, the warfighter optimal action space $O(o|h',a)$ waits for the threat to approach closer in range before shooting to increase kill probability $p_k$ while expending fewer rounds when engaging the threat.

In the example for view 600, the action space of the warfighter includes $n_a$=3 actions of holding fire, low energy operation, and high energy operation of the weapon system. This system 160 has a large state space S including each combination of threat range and rounds remaining (1%-to-100%). This continuous state space S is discretized as shown in view 700 as a graphical solution. The next state transition matrix $T(h'|h,a')$ is computed for each combination of range, rounds remaining, and next action a' using the $p_k$ curves. The computational state space S also contains two terminal states representing the end of the scenario when either the threat is defeated or the warfighter loses, where no further costs or rewards are incurred.

The reward/cost matrix R(h,a) in eqn. (3) is computed using the state transition probabilities in next state transition matrix $T(h'|h,a')$ and the following costs and rewards: the warfighters cost for losing the scenario is −100, the cost of operating the weapon system at the low and high energy levels are −1 and −3 respectively, and the reward for defeating the threat is +10. The state transition matrix $T(h'|h,a)$ and reward/cost matrices R(h,a) are solved numerically using the FIB method shown in eqn. (10) assuming full observability (with the current state being known with 100% certainty), and using a discount factor of $\gamma$=0.9995.

In the two previously discussed POMPD examples, the state space S includes the different combinations of variables presented in the problem/scenario description that models the system of interest and its environment, not including the different actions/decisions that are available. The state transition matrix $T(h'|h,a')$ is computed using the estimated probabilities of moving from one state h to another as a function of the available next actions a'.

Terminal states may also be included that represent the completion of the scenario, which may include a critically damaged state where the system of interest may no longer be used, and a successful state where the system's goal is completed and is no longer needed for use. The reward/cost matrix R(h,a) can then be defined by set of cost and reward criteria representing the expected utility of moving between states based on the state transition probabilities previously specified.

The optimal solution, which is the optimal action space as $O(o|h',a)$ a function of the various actions, the state space S, and the uncertainty of the system 160, is then computed numerically using eqn. (10) upon convergence. In some scenarios, the state space S may be so large so as to be treated as an infinite state space. In this case, a machine learning algorithm, such as a neural network, may be trained using reinforcement learning simulations to compute and approximate the optimal action at run-time as a function of the state space S.

This section summarizes an example methodology of exemplary embodiments for a turbine generator (TG) set of a Navy combat vessel. The TG set is a critical system that must satisfy all the power requirements of the warfighters subsystems. A variety of instruments and sensors can measure the performance of the system. The TG set is usually composed of high-speed rotating machinery, including a steam turbine coupled to an electric generator that converts thermal energy in steam to the mechanical energy in the form of the rotational energy of the turbine. This rotational energy is then converted to electrical power by the motor to be used by all of the ship's subsystems.

Some important parameters to characterize and monitoring the TG set performance include temperature and pressure measurements of the turbine inlets and various stages of the turbine, rotational speed, and voltages and currents of the generator. Both the turbine and generators run on bearings, so related measurements may include vibration accelerations and transmissibility force measurements between the TG set and its support structure. The sensors are wired to a Data Acquisition System (DAQ) 165 that converts these analog electrical signals into digital information for input to health monitoring software operated on the controller 110. Maximum and minimum limits may be monitored for the temperature and pressures to determine whether nominal operational range has been exceeded.

Frequency domain tolerance limits of the currents, voltages, and accelerations of interest may be used to characterize and monitor nominal performance of the system, and points outside the limits may be checked using a Decision Tree machine learning algorithm to identify nominal performance, degradation, and faults/damage. In response to operational failure modes defined for the system, these signals and monitoring algorithms can be used to develop specific fault detection algorithms that perform pattern recognition of the identifying behavior of these failure modes.

An example of the hardware that may be used for the DAQ 165 and computer system is listed in FIG. 9 in tabular form as Table 2 in view 900 and includes an integrated DAQ, computer system, and software to build the health monitoring system using National Instruments hardware. The DAQ cards are used as the data acquisition device 165 that converts the analog electrical signal into digital information. These digital data are transferred through a digital data bus to the controller 110 that executes the health monitoring software incorporating the exemplary algorithms and methodology.

The software may be developed using National Instruments LabView, which is a graphical programming language that contains libraries used for mathematical and scientific computing, signal processing, and configuring the DAQ cards. The UI 170 includes a computer monitor, mouse, and keyboard operated to configure the health monitoring settings and to display the collected data and results of the health monitoring algorithms.

A POMDP may also be developed for this example to automatically determine the optimal use of the system in real-time. The state space S of this system may include the health of the system (nominal, degraded, damaged, maintenance required, stopped for maintenance) and the operational rotational speeds of the TG set. The action space of the system may include the various rotational speeds settings and a perform maintenance action. These state and action spaces can be used to define the state transition matrices and reward/cost matrices for several different warfighter scenarios, including but not limited to: initialization/self-test, cruising, transiting, stealth, patrolling, and engaging various threats.

The state transition matrix T(h'|h,a) is defined using the probabilities of transitioning between the defined states for different actions, and the reward/cost matrix R(h,a) is defined using these probabilities and the cost and reward criteria for each scenario. The observation probability matrix O(o|h',a) is defined using the fault detection algorithm accuracies. The probability of each health state h is calculated at defined time steps (on the order of every 5-to-10 seconds being reasonable for this system). This probability is compared against the thresholds for decreasing operating speed or stopping for maintenance/repair determined by the FIB method in eqn. (10).

The exemplary fitness monitoring system may perform additional functions, but is not limited to: saving the collected data, processing and scaling the data from raw sensor output to engineering units, computing derived quantities, and integration and communication with other control systems. The described exemplary embodiments have been fully tested and successfully demonstrated to function.

The exemplary system, as described, provides real-time, fully-automated fitness monitoring of electrical and mechanical systems. The exemplary process can automatically analyze a significant amount of data collected from a complex system in a negligible amount of time to detect faults, assess the system fitness, and decide the optimal utility of the system 160 by specifying the next action for the system 160 to perform. This would not be possible under human review for large datasets over a long series of actions in a timely and reliable manner.

Rather than employing a human to subjectively review test-data in a time-critical application, the exemplary process incorporates robust statistical methods to characterize expected performance of the system 160. These statistical methods and machine learning algorithms are combined to execute a unique methodology to detect faults, assess system fitness, and render an optimal decision as to which future actions to perform with the system 160.

Also, conventional control theory used to regulate the continuous output of a system, such as a servomotor's position or power provided by an amplifier, does not facilitate making discrete decisions that correspond to different types of actions that a system might perform. This capability is provided by the POMDP operation 115, which may be configured by the operator to adapt the automated use of the system 160 of interest to satisfy specific risk/reward criteria for a variety of scenarios. These fitness-assessment and decision-making capabilities are not provided in a fully-automated, real-time manner by any other system. The only alternative techniques known are the conventional methods, previously described, that require human operations and manual data review. These conventional methods are unreliable and time-consuming.

The exemplary technique may be implemented in any electrical or mechanical system that exhibits measureable quantities that can be used to deduce the fitness of the system 160. The exemplary technique could be applied to currently fielded systems operated by the warfighter to augment or replace unreliable fitness monitoring methods, or systems that need to be fully-automated. This exemplary technique could also be used for monitoring prototype systems that are currently under development. This technique as described is especially applicable to current and future conventional and electric weapon systems that require automated operations integrated with ship-board control.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented system for monitoring an electro-mechanical device, said monitoring system comprising:
    a sensor for measuring a parameter of the device as an analog signal;
    a data acquisition receiver for converting said analog signal into a digital signal; and
    an analysis processor for assigning said digital signal to a condition state responsive to an action mode to control the device, said processor determining detection of a fault, status of a fitness assessment, consequential utility, and observation probability to decide said action mode.

2. The system according to claim 1, further including a user interface for displaying said action mode.

3. The system according to claim 1, wherein said analysis processor further compares said signal data to a statistical tolerance limit for determining deviation occurrence from nominal performance.

4. The system according to claim 3, wherein said analysis processor further compares said signal data to a threshold for selecting said action mode from continuous, intermittent and terminate operations.

5. The system according to claim 4, wherein said tolerance limit is determined from said digital signal.

6. The system according to claim 4, wherein said analysis processor determines that said digital signal deviates from nominal performance by a pattern recognition algorithm.

7. The system according to claim 6, wherein said pattern recognition algorithm determines a type and a severity of said fault.

8. The system according to claim 6, wherein said pattern recognition algorithm determines said fitness assessment.

9. The system according to claim 8, wherein said condition state determines said action mode from continuous, intermittence and terminate operations.

10. The system according to claim 1, wherein said analysis processor computes reward/cost matrices from said consequential utility for determining transition probabilities of said condition state between an initial state and a subsequent state.

11. The system according to claim 1, wherein said analysis processor assigns said condition state based on said consequential utility that constitutes one of a cost and a reward.

12. The system according to claim 1, wherein said processor determines said consequential utility by a reward matrix $$R(h, a) = \begin{bmatrix} (1-p_d)r_c + p_d r_d & r_{s,h}^0 \\ r_d & r_{s,h}^1 \\ 0 & 0 \end{bmatrix}$$

such that h is current fitness, a is current action, $p_d$ is damage probability, $r_c$ is action completion cost, $r_d$ is damage cost, $r_{s,h_0}$ is inappropriate salvo halting cost, and $r_{s,h_1}$ is appropriate salvo halting cost.

13. The system according to claim 1, wherein said processor determines said fault detection by fault probabilities matrix $$F(f|h) = \begin{bmatrix} p(f^0|h^0) & p(f^1|h^0) & 0 \\ p(f^0|h^1) & p(f^1|h^1) & 0 \end{bmatrix}$$

such that p(x|y) denotes the conditional probability of resultant event x occurring given causal event y has occurred for fault f given current fitness h, with superscripts being one of zero for absent and one for present.

14. The system according to claim 1, wherein said processor determines said observation probability by conditional probabilities matrix $$O(o|f) = \begin{bmatrix} p(o^0|f^0) & p(o^1|f^0) \\ p(o^0|f^1) & p(o^1|f^1) \\ 0 & 0 \end{bmatrix}$$

such that such that p(x|y) denotes the conditional probability of resultant event x occurring given causal event y has occurred for monitoring observation o given fault f with superscripts being one of zero for absent and one for present.

* * * * *